United States Patent [19]

Mōri

[11] Patent Number: 4,543,620
[45] Date of Patent: Sep. 24, 1985

[54] CODE GENERATING APPARATUS
[75] Inventor: Tomohiro Mōri, Maebashi, Japan
[73] Assignee: Victor Company of Japan, Ltd., Kanagawa, Japan
[21] Appl. No.: 589,124
[22] Filed: Mar. 13, 1984
[30] Foreign Application Priority Data
 Mar. 16, 1983 [JP] Japan .................. 58-43731
[51] Int. Cl.⁴ .............................. G11B 5/09
[52] U.S. Cl. ...................................... 360/49
[58] Field of Search .......... 360/40, 48, 49, 46; 369/30, 59; 328/28

[56] References Cited
U.S. PATENT DOCUMENTS
 4,329,719 5/1982 Ninomiya ................... 360/49

Primary Examiner—Vincent P. Canney
Attorney, Agent, or Firm—Ladas & Parry

[57] ABSTRACT

A code generating apparatus comprises an oscillator for continuously producing a sinusoidal wave which has a constant frequency, a square wave generating circuit supplied with the output sinusoidal wave of the oscillator, for generating first and second square waves having period which is twice the period of the sinusoidal wave, where the first and second square waves having mutually inverted phases, a code transmitting circuit prestored with a code which is to be generated, as a bit sequence, for alternately transmitting through first and second output terminals thereof the bit sequence in terms of one bit in phase with the first or second square wave, a switching signal producing circuit for producing a switch signal from a combination of the first and second square waves and output signals from the first and second output terminals of the code transmitting circuit, and a switching circuit controlled in response to the switching signal from the switching signal producing circuit, for selectively and intermittently producing through a code output terminal thereof the output sinusoidal wave of the oscillator as the code.

6 Claims, 7 Drawing Figures

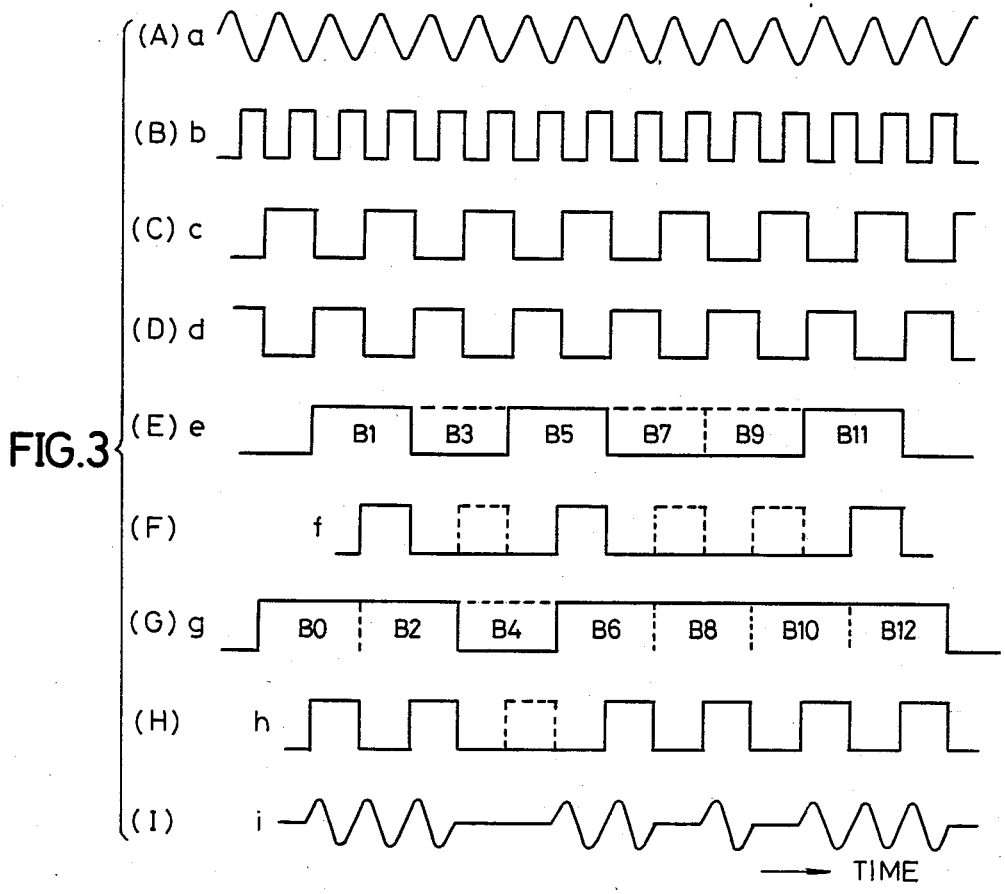
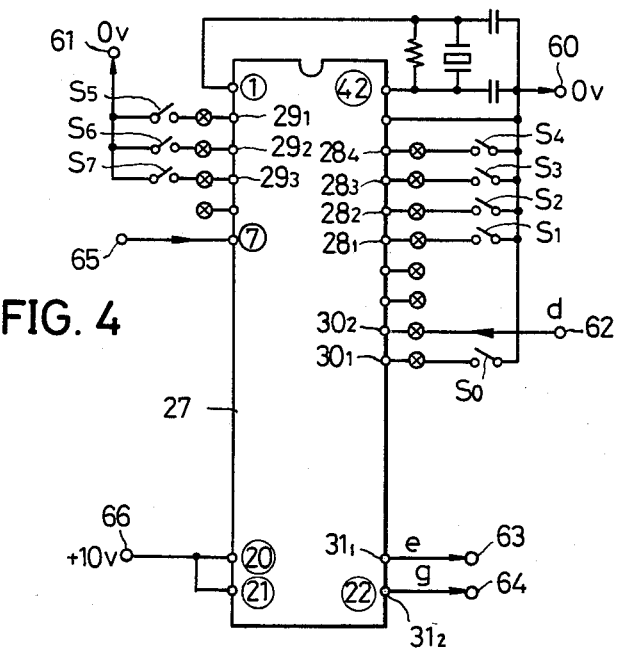

CODE GENERATING APPARATUS

BACKGROUND OF THE INVENTION

The present invention generally relates to code generating apparatuses for generating a code which may be used as an absolute address on a recording medium or the like, and more particularly to a code generating apparatus which produces a square wave which is in phase with a sinusoidal wave having a constant frequency, and intermittently generates a sinusoidal wave as a code based on this square wave.

Presently, cassette tapes are the most popularly used recording medium. The cassette tapes are widely used in tape recorders which have a built-in radio, and cassette decks, as a recording medium on which an audio signal is recorded and from which the audio signal is reproduced. In order to enable a more convenient use of the cassette tape, some tape recorders are equipped with a music selecting function for detecting an unrecorded band between recorded music pieces so as to find the beginning of a desired recorded music piece. This music selection which is carried out by detecting the unrecorded band, is advantageous in that the existing magnetic tape can be used. However, it is impossible to detect an absolute address during such a music selection. Therefore, it was difficult to meet the demands of a random access.

Accordingly, in order to meet the demand of detecting the absolute address on the magnetic tape, various proposals have been made to record on the magnetic tape a code which indicates the absolute address. According to one proposal, a sinusoidal wave of 5 Hz to 10 Hz is intermittently recorded on the magnetic tape as a code, in a portion which is to be the unrecorded band. According to this proposed system, there will be no harmonic within the audio frequency band, because the code which is recorded has a frequency lower than the audio frequency band and is a sinusoidal wave. Thus, when the code is reproduced, the code will not be heard by the listener. This proposed system enables the detection of the absolute address in a mode in which the reproduction is carried out at a normal tape speed and in a mode in which the reproduction is carried out at a high tape speed.

However, when generating the code described above, the sinusoidal wave had to be generated so as to accurately start from a zero-crossing point and accurately terminate at a zero-crossing point. Otherwise, a harmonic was generated due to a waveform distortion in the code when the code was reproduced. In this case, the generated harmonic entered within the audio frequency band, and was audible to the listener as noise.

SUMMARY OF THE INVENTION

Accordingly, it is a general object of the present invention to provide a novel and useful code generating apparatus in which the problems described before have been eliminated.

Another and more specific object of the present invention is to provide a code generating apparatus in which a code transmitting circuit is pre-stored with a code which is to be transmitted in the form of a bit sequence, the bit sequence is alternately transmitted in terms of one bit through two output terminals of the code transmitting circuit in phase with a ½ frequency divided output of a sinusoidal wave which is produced from an oscillator, and the sinusoidal wave is selectively produced as output in response to a switching signal which is produced from a combination of the alternately transmitted bit sequence and the ½ frequency divided output.

According to the apparatus of the present invention, a code which is obtained by intermittently producing the sinusoidal wave in correspondence with the bit sequence, has a waveform which accurately starts from a zero-crossing point of the sinusoidal wave which is produced from the oscillator and accurately terminates at a subsequent zero-crossing point of the sinusoidal wave which is produced from the oscillator. Thus, in a case where the intermittently produced sinusoidal wave is selected to have a frequency outside the audio frequency band, and is recorded on a magnetic tape as a code which indicates an absolute address on the magnetic tape, in an unrecorded band between recorded music pieces, for example, and is then reproduced, it is possible to prevent a harmonic from being generated due to a waveform distortion in the code. When the harmonic is generated, this harmonic would be audible to the listener as noise, however, there will be no audible noise of this kind according to the present invention since the harmonic will not be generated.

Other objects and further features of the present invention will be apparent from the following detailed description when read in conjunction with the accompanying drawings.

BRIEF DESCRIPTION OF THE DRAWINGS

FIGS. 3(A) through 3(I) show signal waveforms at each part of the circuit, shown in FIG. 2;

FIG. 4 is a circuit diagram showing an embodiment of an essential part of the circuit shown in FIG. 2;

DETAILED DESCRIPTION

Figure 1A:
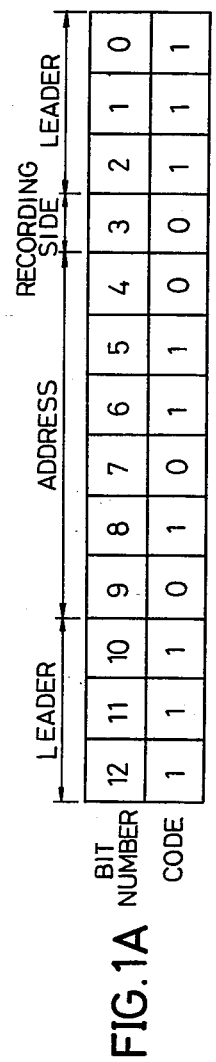
FIGS. 1A and 1B respectively show an example of a code which is to be generated by a code generating apparatus according to the present invention, and an example of the waveform of the code.
Figure 1B:
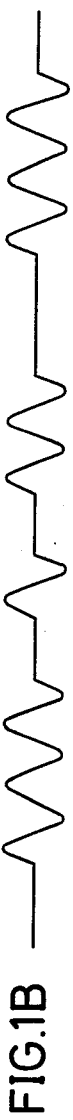

First, description will be given with respect to a code which is to be generated by a code generating apparatus according to the present invention, and the waveform of the code. A code waveform shown in FIG. 1B is made up from an intermittent sinusoidal wave which contains no distortion. The existence of the sinusoidal wave for one period thereof corresponds to a logic level "1", and the non-existence of the sinusoidal wave for one period thereof corresponds to a logic level "0". In this manner, one period of the sinusoidal wave is set to correspond to one bit, and 13 of such bits are recorded as one continuous code on a magnetic tape, for example. Among the 13 bits, the upper 3 bits and the lower 3 bits, that is, the bits numbers "0" through "2" and the bit numbers "10" through "12", are constantly set to a logic level "1" as shown in FIG. 1A. The upper 3 bits and the lower 3 bits are used as leader parts for the bits which indicate an address. It will be assumed that the bit number "3" indicates the first side or the second side of the magnetic tape by assuming a logic level "0" or "1", and that the remaining 6 bits indicates the address.

In order to obtain the intermittent sinusoidal wave, the present invention generates a continuous sinusoidal wave. Further, a 13-bit code such as the one shown in FIGS. 1A and 1B is pre-stored in a code transmitting circuit as a bit sequence, and the bit sequence is read out from the code transmitting circuit in terms of one bit. The sinusoidal wave is intermittently produced according to the read out bit sequence.

Figure 2:
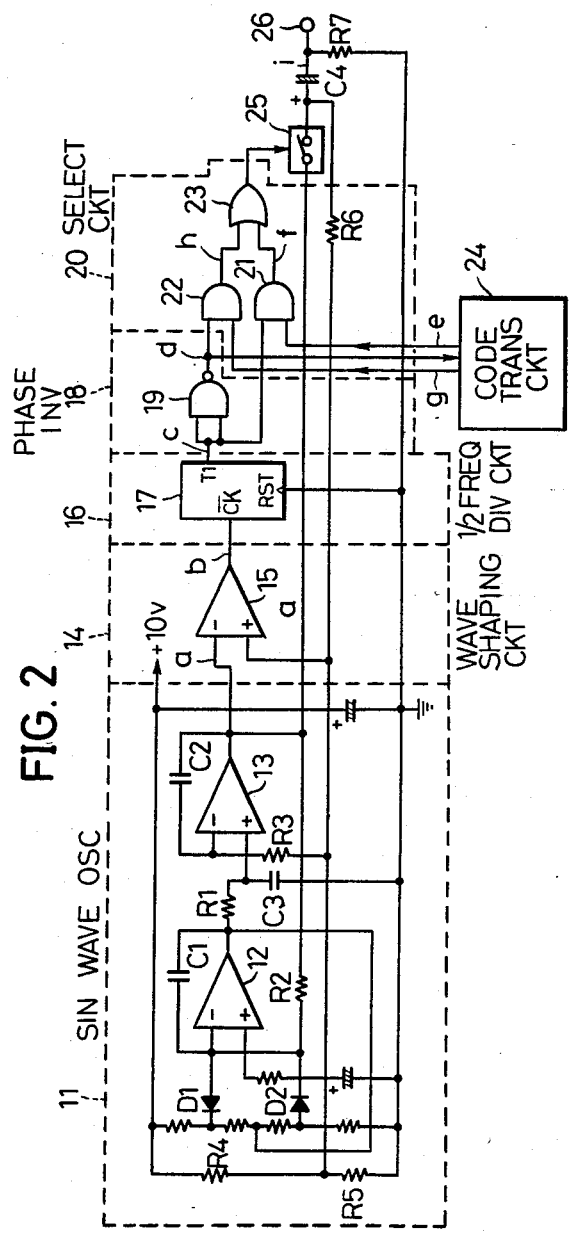
FIG. 2 is a circuit diagram showing an embodiment of a code generating apparatus according to the present invention.

In FIG. 2, a sinusoidal wave oscillator 11 is a known and so-called quadrature oscillator, and comprises operational amplifiers 12 and 13, resistors R1 through R3, capacitors C1 through C3, diodes D1 and D2, and the like. The oscillator 11 continuously produces a sinusoidal wave a shown in FIG. 3(A) having a frequency of 10 Hz, for example, which is lower than the audio frequency band, through an output terminal of the operational amplifier 13. The amplitude of the sinusoidal wave a which is produced from the operational amplifier 13, can be accurately determined by a limiter constituted by the diodes D1 and D2. The sinusoidal wave a is supplied to a wave shaping circuit 14 and to a switching circuit 25.

The wave shaping circuit 14 operates an operational amplifier 15 as a comparator. The operational amplifier 15 compares the level of the sinusoidal wave a which is applied to an inverting input terminal thereof, and the level of a center D.C. voltage which is applied to a non-inverting input terminal thereof. This center D.C. voltage is obtained by voltage-dividing a power source voltage of +10 volts by ½, by resistors R4 and R5 within the oscillator 11. The operational amplifier 15 produces a pulse sequence b shown in FIG. 3(B) according to the levels of the two signals applied thereto. This pulse sequence b has a period which is the same as the period of the sinusoidal wave a, and is in phase with the sinusoidal wave a. The pulse sequence b is applied to a flip-flop 17 which constitutes a ½-frequency dividing circuit 16. The flip-flop 17 frequency-divides the pulse sequence b by ½, and produces a first square wave c shown in FIG. 3(C). The first square wave c has a period which is twice the period of the sinusoidal wave a. The first square wave c is supplied to a phase inverting circuit 18 and to a selecting circuit 20.

The first square wave c is applied to two input terminals of a 2-input NAND circuit 19 within the phase inverting circuit 18. As a result, the NAND circuit 19 produces a second square wave d shown in FIG. 3(D) which has an inverted phase with respect to the phase of the first square wave c. The selecting circuit 20 comprises 2-input AND circuits 21 and 22, and a 2-input OR circuit 23. The first square wave c is applied to one input terminal of the AND circuit 21, and the second square wave d is applied to one input terminal of the AND circuit 22. Further, an output signal e shown in FIG. 3(E) of a code transmitting circuit 24 is applied to the other input terminal of the AND circuit 21, and an output signal g shown in FIG. 3(G) of the code transmitting circuit 24 is applied to the other input terminal of the AND circuit 22.

The code transmitting circuit 24 is pre-stored with a code as a bit sequence, and is supplied with the second square wave d. The code transmitting circuit 24 successively produces bit signals B1, B3, B5, . . . , B11 of the signal e through a first output terminal, every time a rising edge of the second square wave d is supplied thereto. The bit signals B1, B3, B5, . . . , B11 of the signal e respectively correspond to the bit numbers "1", "3", "5", . . . , "11" of the code. In addition, the code transmitting circuit 24 successively produces bit signals B0, B2, B4, . . . , B12 of the signal g through a second output terminal, every time a trailing edge of the second square wave d is supplied thereto. The bit signals B0, B2, B4, . . . , B12 of the signal g respectively correspond to the bit numbers "0", "2", "4", . . . , "12" of the code. The code transmitting circuit 24 stores a code which indicates the address, the recording side, or the like and is to be recorded on the magnetic tape, as a bit sequence, through an externally performed operation. The bit signals B0 through B12 assume a high level or a low level, according to the code which is stored in the code transmitting circuit 24.

For example, suppose that the code shown in FIG. 1A is stored in the code transmitting circuit 24 as a bit sequence. In this case, the signal e shown in FIG. 3(E) in which the bit signals B1, B3, B5, B7, B9, and B11 are time-sequentially multiplexed, is produced through the first output terminal of the code transmitting circuit 24. Moreover, the signal g shown in FIG. 3(G) in which the bit signals B0, B2, B4, B6, B8, B10, and B12 are time-sequentially multiplexed, is produced through the second output terminal of the code transmitting circuit 24. In other words, the code transmitting circuit 24 alternately produces the signals e and g through the first and second output terminals, in terms of one bit, in a sequence of B0, B1, B2, . . . , and B12, and in phase with the second square wave d. As described before, the signal e is supplied to the other input terminal of the AND circuit 21 and the signal g is supplied to the other input terminal of the AND circuit 22.

Figure 6:
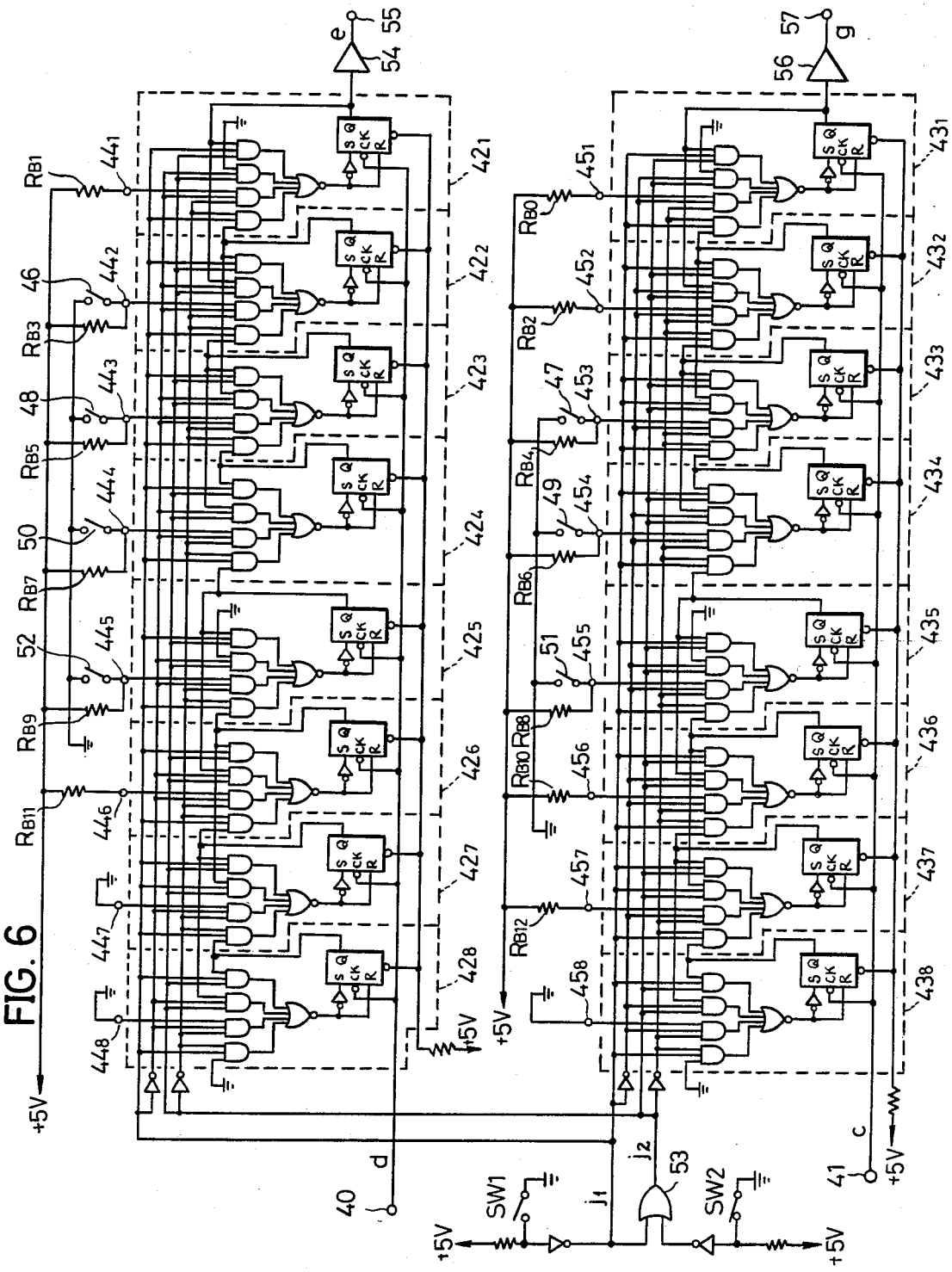
FIG. 6 is a circuit diagram showing another embodiment of the essential part of the circuit shown in FIG. 2.

As shown in FIG. 3(E), the signal e is a digital signal in which the bit signals B3, B7, and B9 assume a low level, and the bit signals B1, B5, and B11 assume a high level. On the other hand, as shown in FIG. 3(G), the signal g is a digital signal in which only the bit signal B4 assumes a low level, and the other bit signals B0, B2, B6, B8, B10, and B12 assume a high level. Accordingly, as shown in FIG. 6 which will be described later on in the specification, the code transmitting circuit 24 may be constituted from registers, electronic switches, and a circuit which has an input terminal for reading out the bits and two output terminals for alternately producing the bits. The code transmitting circuit 24 may also be constituted from a central processing unit (CPU) of a microcomputer which will be described later on in the specification in conjunction with FIG. 4.

The signals e and g which are transmitted from the code transmitting circuit 24 in terms of one bit, are respectively supplied to the AND circuits 21 and 22, and the AND circuit 21 performs a logical multiplication between the signal e and the first square wave c while the AND circuit 22 performs a logical multiplication between the signal g and the second square wave d. As a result, a pulse f shown in FIG. 3(F) is produced from the AND circuit 21, and a pulse h shown in FIG. 3(H) is produced from the AND circuit 22. The pulses f and h are passed through the 2-input OR circuit 23, and an output signal of the OR circuit 23 is applied to the switching circuit 25 as a switching signal. The switching circuit 25 is controlled by the output switching signal of the OR circuit 23, so as to pass the incoming signal for a duration in which the switching signal assumes a high level and to block the incoming signal for a duration in which the switching signal assumes a low level. In other words, the selecting circuit 20 constitutes a switching signal producing circuit for producing a switching signal which controls the switching circuit 25.

Under the control of the switching signal supplied thereto, the switching circuit 25 selectively produces the sinusoidal wave a from the oscillator 11. The output signal of the switching circuit 25 is passed through a D.C. blocking capacitor C4, and is produced through an output terminal 26 as a code signal i shown in FIG. 3(I). In FIG. 2, the power source voltage is voltage-divided by the resistors R4 and R5 and is supplied to a connection point between the output side of the switching circuit 25 and the capacitor C4, through a resistor R6. Furthermore, a connection point between the capacitor C4 and the output terminal 26 is grounded through a resistor R7. These measures are taken to eliminate the transient response of the capacitor C4 when the switching circuit 25 turns ON and OFF. According to the present embodiment of the invention, the code which is pre-stored in the code transmitting circuit 24 is alternately produced through the first and second output terminals, in terms of one bit, for every one period of the input sinusoidal wave a. One bit of the code is read out at a zero-crossing point of the input sinusoidal wave a and supplied to the selecting circuit 20, so that this read out bit becomes effective at a subsequent zero-crossing point. Therefore, one period of a sinusoidal wave i which accurately starts from a zero-crossing point of the sinusoidal wave a and accurately terminates at a subsequent zero-crossing point, can be produced intermittently through the output terminal 26. This sinusoidal wave i is multiplexed with an audio signal, for example, and recorded on the magnetic tape.

Next, a more detailed description will be given with respect to the construction and operation of the code transmitting circuit 24 which constitutes an essential part of the apparatus according to the present invention. Nowadays, the generation of control signals and the control of the tape recorder, are performed by a central processing unit (CPU). This is because the application of a code to a circuit, the display of the code, the operations of the mechanisms, the switching of the input signal, and the like can be controlled with ease by use of the CPU. As shown in FIG. 4, the code transmitting circuit 24 can also be constituted by the use of a CPU. However, the CPU is designed to generate control signals by processing programs based on an internal clock. Thus, it is impossible for the CPU to find the zero-crossing point of the sinusoidal wave and transmit a signal at this zero-crossing point without a delay.

Accordingly, in the present invention, the control signals have opposite phases as shown by the square waves c and d. Further, the gate signals e and g are respectively produced from a CPU 27 at respective points which are one period of the sinusoidal wave prior to respective starting points when the required signals f and h are gated. As a result, even when a delay occurs in processing the program in the CPU 27 with respect to frequency divided control signals, that is, the square waves c and d, this delay will have no effect on the zero-crossing point of the code signal. In the present embodiment, the sinusoidal wave is accurately generated at the zero-crossing point by such control of the CPU 27.

In FIG. 4, the CPU 27 is a known integrated circuit (IC) having 42 pins. For example, a CPU μPD546C manufactured by Nippon Electric Co., Ltd. of Japan, may be used for the CPU 27. Switches S1 through S4 are coupled between an earth terminal 60 and respective input ports $28_1$ through $28_4$ of the CPU 27. Switches S5 through S7 are coupled between an earth terminal 61 and respective input ports $29_1$ through $29_3$. An input port $30_1$ of the CPU 27 is coupled to a switch S0 for starting a code transmitting program. The second square wave d is applied to an input port $30_2$ through a terminal 62. The signals e and g are respectively produced through output ports $31_1$ and $31_2$ to output terminals 63 and 64. The switch S1 is a switch for supplying to the CPU 27 the bit signal B3 of the bit number "3" shown in FIG. 1. Similarly, the switches S2 through S7 are switches for supplying to the CPU 27 the respective bit signals B4 through B9 (data indicating the address) of the bit numbers "4" through "9". In FIG. 4, a symbol " " represents a pull-up terminal, and indicates that this terminal is coupled to a power source terminal (not shown) of +10 volts, for example, through a resistor (not shown). A power source terminal 66 of 10 V is connected to the 20th and 21st pens of the CPU 27.

Figure 5:
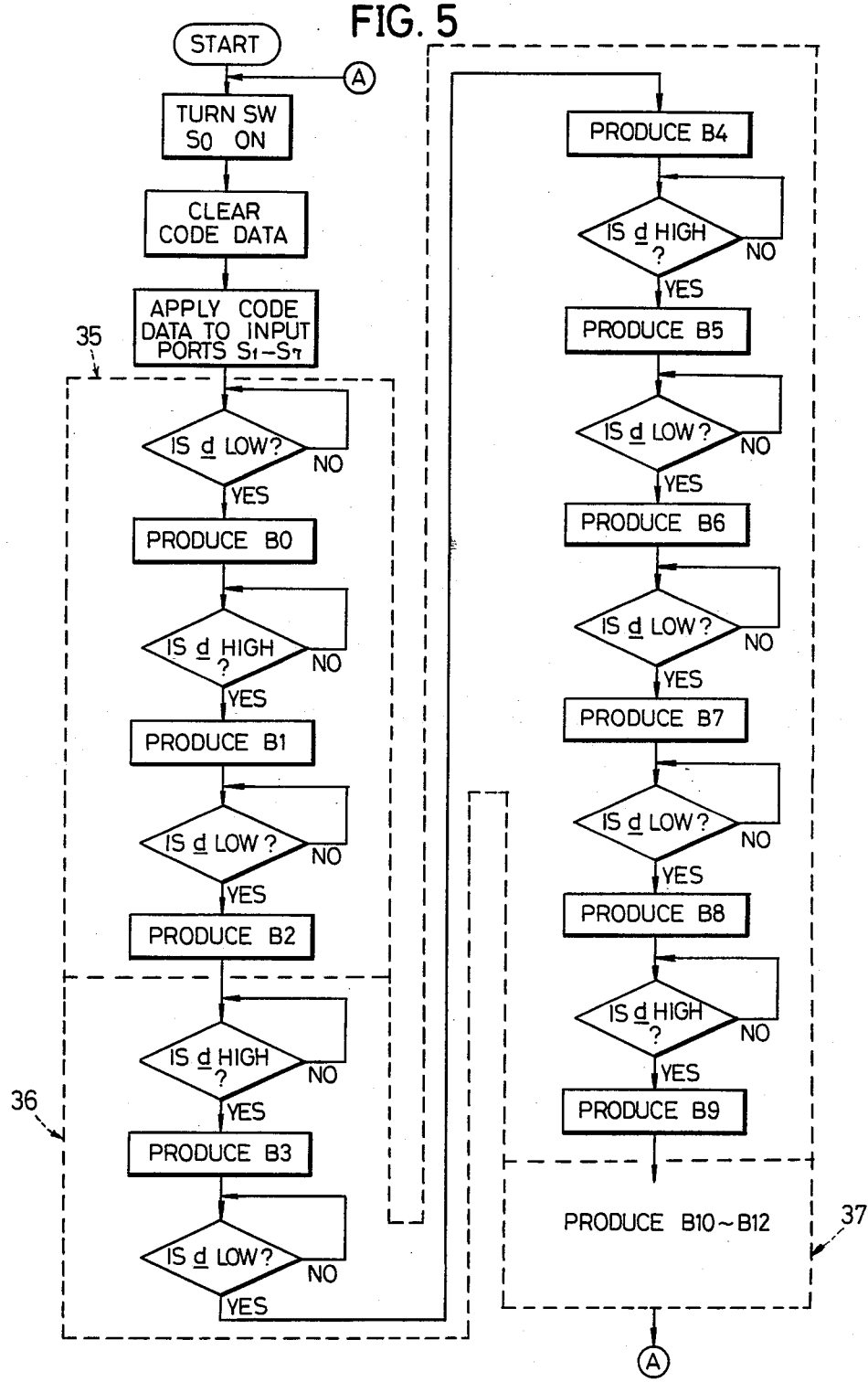
FIG. 5 is a flowchart for explaining the operation of a central processing unit in the circuit shown in FIG. 4.

When the start switch S0 is turned ON to start the program after a reset signal is supplied through an input terminal 65 to a No. 7 pin of the CPU 27, the CPU 27 clears the data, and starts to perform the operations which are in accordance with a flowchart shown in FIG. 5 when the code indicating the address and the like is supplied thereto depending on the ON and OFF states of the switches S1 through S7. In FIG. 5, a routine 35 discriminates whether the second square wave d is of a low level or a high level. When the second square wave d assumes a high level, the CPU 27 produces the signal g (bit signal B0) which indicates the bit number "0" through the output port $31_2$, at a point when the second square wave d subsequently assumes a low level (at a trailing edge of the second square wave d). Thereafter, the CPU 27 alternately produces the signal e (bit signal B1) which indicates the bit number "1" and the signal g (bit signal B2) which indicates the bit number "2" at points when the rising and trailing edges of the second square wave d are detected. These three bit signals B0 through B2 of the bit numbers "0" through "2", all assume the logic level "1".

In a routine 36, the CPU 27 produces the bit signals B3, B5, B7, and B9 of the bit numbers "3", "5", "7", and "9" as the signal e through the output port $31_1$, and produces the bit signals B4, B6, and B8 of the bit numbers "4", "6", and "8" as the signal g through the output port $31_2$, respectively in phase with the rising and trailing edges of the second square wave d, according to a recording side data IB3 of the bit number "3" and data IB4 through IB9 of the bit numbers "4" through "9" which are applied to the CPU 27 through the switches S1 through S7 immediately before the CPU 27 started the processing operations of the routine 35. Further, in a subsequent routine 37, the CPU 27 alternately produces through the output ports 311 and 312 the bit signals B10 through B12 of the bit numbers "10" through "12" in succession, by performing a processing operation which is the same as the processing operation of the routine 35. The contents of the routines 37 and 35 are the same, and only the bit numbers which are produced differ between the two routines. Thus, the illustration of the details of the routine 37 are omitted in FIG. 5 The operation after the routine 37 continues as shown by a symbol " ". Hence, it is possible to continuously change the bit signals B0 through B12 of the code and transmit the changed code.

A predetermined circuit may be used instead of the switches S1 through S7, so as to supply an arbitrary address code to the CPU 27 by use of the predetermined circuit alone.

Next, description will be given with respect to the construction and operation of the code transmitting circuit 24 which is constituted from registers and electronic switches, by referring to FIG. 6. In FIG. 6, the second square wave d is applied to an input terminal 40 as a clock pulse, and the first square wave c is applied to an input terminal 41 as a clock pulse. The second square wave d from the input terminal 40 is applied to respective clock terminals of R-S (reset-and-set) flip-flops within circuits $42_1$ through $42_8$. On the other hand, the first square wave c from the input terminal 41 is applied to respective clock terminals of R-S flip-flops within circuits $43_1$ through $43_8$. The circuits $42_1$ through $42_8$ and $43_1$ through $43_8$ each comprises four 3-input NAND circuits, a 4-input NOR circuit which is supplied with output signals of the four 3-input NAND circuits, and an R-S flip-flop which is applied with an output signal of the 4-input NOR circuit to a reset terminal thereof and with the output signal of the 4-input NOR circuit to a set terminal thereof through an inverter.

The circuits $42_1$ through $42_8$ constitute an 8-bit shift register. This 8-bit shift register loads the data which is supplied to parallel input terminals $44_1$ through $44_8$ when a switch SW1 is turned ON and a signal j1 assumes a high level and an output signal j2 of an OR circuit 53 assumes a high level. On the other hand, when the signal j1 assumes a low level and the signal j2 assumes a high level (that is, when only a switch SW2 is turned ON between the switches SW1 and SW2), the above 8-bit shift register shifts the loaded data in phase with the rising edge of the second square wave d toward the right in FIG. 6. Similarly, the circuits $43_1$ through $43_8$ constitute an 8-bit shift register. This 8-bit shift register constituted by the circuits $43_1$ through $43_8$ loads the data supplied to parallel input terminals $45_1$ through $45_8$ when the signals j1 and j2 assume a high level, and shifts the loaded data in phase with the rising edge of the first square wave c toward the right in FIG. 6 when the signal j1 assumes a low level and the signal j2 assumes a high level.

Accordingly, when the bit signals B1, B3, B5, B7, B9, and B11 of the bit numbers "1", "3", "5", "7", "9", and "11" are respectively supplied to the input terminals $44_1$, $44_2$, $44_3$, $44_4$, $44_5$, and $44_6$ and the loaded bit signals are shifted to the right in FIG. 6, the signal e described before is obtained from a Q-output terminal of the flip-flop within the circuit $42_1$, through a buffer amplifier 54 and an output terminal 55. The bit signals B1 and B11 constantly assume the logic level "1". Thus, the input terminals $44_1$ and $44_6$ are coupled to a positive power source voltage input terminal through respective resistors $R_{B1}$ and $R_{B11}$. Further, the input terminals $44_7$ and $44_8$ are grounded. On the other hand, the input terminals $44_2$, $44_3$, $44_4$, and $44_5$ are coupled to the positive power source voltage input terminal through respective resistors $R_{B3}$, $R_{B5}$, $R_{B7}$, and $R_{B9}$, and are also grounded through respective switches 46, 48, 50, and 52.

Similarly, when the bit signals B2, B4, B6, B8, B10, and B12 are respectively supplied to the input terminals $45_1$, $45_2$, $45_3$, $45_4$, $45_5$, $45_6$, and $45_7$ and the loaded data is shifted toward the right in FIG. 6, the signal g is obtained from a Q-output terminal of the flip-flop within the circuit $43_1$ through a buffer amplifier 56 and an output terminal 57. The bit signals B0, B2, B10, and B12 constantly assume the logic level "1". Hence, the input terminals $45_1$, $45_2$, $45_6$, and $45_7$ are coupled to the positive power source voltage input terminal through respective resistors $R_{B0}$, $R_{B2}$, $R_{B10}$, and $R_{B12}$. On the other hand, the bit signals B4, B6, and B8 assume the logic level "0" or "1" depending on the code data. For this reason, the input terminals $45_3$, $45_4$, and $45_5$ are coupled to the positive power source voltage input terminal through respective resistors $R_{B4}$, $R_{B6}$, and $R_{B8}$, and are also grounded through respective switches 47, 49, and 51. Moreover, because the input data to the circuit $43_8$ is not used, the input terminal $45_8$ is constantly grounded.

In the circuit shown in FIG. 6, the ON and OFF states of the switches 46 through 52 are controlled according to the contents of the code data, and the ON and OFF states of the switches SW1 and SW2 are thereafter controlled so that the signals j1 and j2 both assume a high level so as to load the bit signals B0 through B12 to the 8-bit shift registers which are respectively constituted by the circuits $42_1$ through $42_8$ and the circuits $43_1$ through $43_8$. Then, the switch SW1 is turned OFF and the switch SW2 is turned ON, to alternately obtain the signals e and g in terms of one bit, through the output terminals 55 and 57.

A square wave generating circuit for generating the square waves c and d may be designed to apply the pulse sequence b to a flip-flop, so as to simultaneously obtain the square waves c and d through a Q-output terminal and a $\overline{Q}$-output terminal of this flip-flop.

Further, the present invention is not limited to these embodiments, but various variations and modifications may be made without departing from the scope of the present invention.

What is claimed is:
1. A code generating apparatus comprising:
an oscillator for continuously producing a sinusoidal wave which has a constant frequency;
a square wave generating circuit supplied with the output sinusoidal wave of said oscillator, for generating first and second square waves having a period which is twice the period of said sinusoidal wave, said first and second square waves having mutually inverted phases;
a code transmitting circuit pre-stored with a code which is to be generated, as a bit sequence, for alternately transmitting through first and second output terminals thereof said bit sequence in terms of one bit in phase with said first or second square wave;
a switching signal producing circuit for producing a switching signal from a combination of said first and second square waves and output signals from said first and second output terminals of said code transmitting circuit; and
a switching circuit controlled in response to said switching signal from said switching signal producing circuit, for selectively and intermittently producing through a code output terminal thereof the output sinusoidal wave of said oscillator as the code.

2. A code generating apparatus as claimed in claim 1 in which said square wave generating circuit comprises a comparator for comparing levels of the sinusoidal wave from said oscillator and a reference D.C. voltage which is selected equal to a zero-crossing point of the sinusoidal wave and for producing a pulse sequence having a repetition frequency which is the same as the repetition frequency of the sinusoidal wave, a frequency dividing circuit for frequency-dividing the output pulse sequence of said comparator by ½, and a phase inverting circuit for passing an output square wave of said frequency dividing circuit with the phase thereof unchanged so as to produce the output square wave of said frequency dividing circuit as said first square wave, and for inverting the phase of said first square wave so as to produce the first square wave with the inverted phase as said second square wave.

3. A code generating apparatus as claimed in claim 1 in which said switching circuit comprises an input terminal coupled to an output terminal of said oscillator, and an output terminal coupled to one terminal of a D.C. blocking capacitor, and to a resistor circuit network, for voltage-dividing the power source voltage, through a first resistor in series, and said D.C. blocking capacitor has another terminal coupled to ground through a second resistor, and to said code output terminal.

4. A code generating apparatus as claimed in claim 1 in which said code transmitting circuit comprises a first register pre-stored with an m-bit bit data related to every other bits in an n-bit code which is to be generated, for shifting the pre-stored bit data and for producing a bit sequence in series through said first output terminal in response to said first square wave, where n is a natural number and m is a natural nearest to n/2, and a second shift register pre-stored with an (n−m)-bit data related to remaining bits in the n-bit code which is to be generated, for shifting the pre-stored bit data and for producing a bit sequence in series through said second output terminal in response to said second square wave.

5. A code generating apparatus as claimed in claim 1 in which said code transmitting circuit comprises a central processing unit which is pre-stored with each bit data related to an n-bit code which is to be generated, where n is a natural number, and said central processing unit alternately produces through first and second output ports thereof the pre-stored n-bit data in series, with every incoming rising and trailing edges of said first or second square wave which is supplied thereto through an input port thereof.

6. A code generating apparatus as claimed in claim 1 in which a predetermined number of upper and lower bits among a plurality of bits in said code which is to be generated are respectively allocated for first and second leader parts which contain fixed data, and remaining number of bits in said code are allocated for a specific bit region between said first and second leader parts, and said specific bit region contains data which indicates a recording side of a recording medium and data which indicates an absolute address on the recording medium.

* * * * *